United States Patent
Ribarich et al.

(10) Patent No.: US 7,190,151 B2
(45) Date of Patent: Mar. 13, 2007

(54) HIGH INTENSITY DISCHARGE LAMP BALLAST CIRCUIT

(75) Inventors: Thomas J. Ribarich, Laguna Beach, CA (US); Cecilia Contenti, Hermosa Beach, CA (US); Masashi Sekine, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/800,549

(22) Filed: Mar. 15, 2004

(65) Prior Publication Data

US 2004/0217742 A1    Nov. 4, 2004

Related U.S. Application Data

(60) Provisional application No. 60/487,491, filed on Jul. 14, 2003, provisional application No. 60/455,652, filed on Mar. 18, 2003.

(51) Int. Cl.
*G05F 1/24* (2006.01)
(52) U.S. Cl. .................. 323/259; 323/284; 323/225
(58) Field of Classification Search ............... 323/225, 323/242, 247, 259, 282, 283, 284, 288, 290; 363/25
See application file for complete search history.

(56) References Cited

U.S. PATENT DOCUMENTS

| 5,654,881 A | * | 8/1997 | Albrecht et al. ............... 363/25 |
| 5,894,243 A | * | 4/1999 | Hwang ....................... 323/282 |
| 6,278,245 B1 | | 8/2001 | Li et al. |

OTHER PUBLICATIONS

International Search Report issued Oct. 14, 2005.

* cited by examiner

*Primary Examiner*—Jessica Han
(74) *Attorney, Agent, or Firm*—Ostrolenk, Faber, Gerb & Soffen, LLP

(57) ABSTRACT

An integrated circuit controls a power converter that includes single stage buck-boost converter and a switching full bridge that may be used to drive an HID lamp. The single stage buck-boost converter reduces the complexity and parts count of the power converter, or electronic ballast, while permitting PFC and DC bus voltage regulation under control of the integrated circuit. The integrated circuit also provides all the drive signals to operate the switching full bridge circuit to maintain constant power on the HID lamp. A wait timer provides an interval of time between restart attempts for the HID lamp to permit the lamp to cool so that high hot restart voltages are avoided. The integrated circuit simplifies the design of power converters and electronic ballasts in particular, while contributing to reducing part count, complexity and cost in conjunction with the single stage buck-boost converter.

22 Claims, 5 Drawing Sheets

HIGH INTENSITY DISCHARGE LAMP BALLAST CIRCUIT

RELATED APPLICATIONS

This application is based on and claims benefit of U.S. Provisional Application No. 60/455,652, filed Mar. 18, 2003, entitled "High Intensity Discharge Lamp Ballast Circuit," and U.S. Provisional Application No. 60/487,491, filed Jul. 14, 2003, entitled "High Intensity Discharge (HID) Ballast Control Circuit" upon both of which a claim of priority is hereby made.

BACKGROUND OF THE INVENTION

1. Field of the Invention

The present invention relates generally to electronic lamp ballasts, and relates more particularly to an electronic lamp ballast and control for a high intensity discharge lamp.

2. Description of Related Art

High intensity discharge (HID) lamps have been in use for a number of years in a variety of lighting applications. Four types of HID lamps are typically used in practice, including mercury vapor, low pressure sodium, high pressure sodium and metal halide. HID lamps enjoy a number of advantages over incandescent lighting and fluorescent lighting, but also have some comparative limitations. For example, HID lamps typically do not start immediately, but require some warm up time to come to full illumination. In addition, HID lamps typically emit light in several different colors, for example, mercury vapor lamps tend to have a bluish color while sodium lamps tend to have a yellow color output. Metal halide lamps typically have a bright white output and is preferred for a number of applications where light quality is an important factor.

Fluorescent lamps tend to be much larger than HID lamps and have nearly instant start up and restart times. In addition, fluorescent lamp performance tends to be very temperature sensitive, while HID lamps can operate in a variety of environments without significant decreases in performance.

In the past, HID lamps have dominated the lighting market because of the high lumen output, high efficiency and superior light quality provided by metal halide HID lamps. The typical metal halide HID lamp was formerly driven by magnetic ballast, which were not usually optimized for any particular application. Presently, electronic ballasts for metal halide HID lighting applications have been developed that increase the performance and efficiency of the HID lamp, which has the advantageous result of decreasing maintenance and energy costs. The use of electronic ballasts also permits HID lamps to be operated in a dimming mode. Electronic ballast may also be made to adapt to the changing conditions of the lamp over its life, and thus compensate for a typical reduction in light output from the lamp over its lifetime. By compensating for the reduction in light output, the electronic ballast can maintain a higher and consistent light level for the duration of the life of the lamp. Accordingly, electronic ballasts reduce the need for frequent lamp replacement, while improving efficiency, thereby reducing the overall count of lighting fixtures needed to realize a particular application.

In a typical HID lamp, an igniter is used to start the lamp, which improves the lamp life and simplifies operation of the lamp. In prior HID lamps, a large open circuit voltage was needed to ignite the lamp, causing a high lamp current crest factor that contributed to diminishing the lifetime of the lamp. By providing an igniter, the electronic ballast for the HID lamp can operate at a potentially lower voltage that provides a number of advantages. For example, it is typically preferable to operate an electronic ballast for an HID lamp at a given frequency to avoid interference with other electronic equipment and improve the efficiency of the lighting application. Electronic ballasts are also able to maintain lamp power at a particular rated point for the lamp throughout its lifetime. Maintaining lamp power throughout the lifetime of the lamp is important because the intrinsic voltage of the lamp arc tube changes as the lamp ages, and electronic ballasts should be adaptable to maintain a constant power output.

In general, HID lamps have higher ignition voltages than fluorescent lamps, typically in the range of 3 Kv when measured peak-to-peak. HID lamps generally also have no filaments, which avoids the need to preheat filaments, where fluorescent lamps typically require filament preheat. While electronic ballasts for fluorescent lamps are typically operated at 30 to 50 kHz, HID lamps are operated in a range that avoids these frequencies due to the problem of acoustic resonance that can cause damage and catastrophic failure to the lamp. Thus, HID lamps are often operated in the range of low frequencies, typically a few hundred Hertz. In these low frequency ranges, full bridge switching circuits are used to drive HID lamps with a square wave without resonant output circuits. Realizing a good HID electronic ballast design also includes handling the design challenge of high ignition voltage when attempting to ignite a hot HID lamp. In this circumstance, the ignition voltage can rise to voltages on the order of approximately 25 kV, which can be difficult for an electronic ballast to handle.

Another design criteria that an electronic ballast preferably handles is power factor correction (PFC). A typical power converter connected to a line input should ideally draw current and voltage in phase with each other, so that the power converter load appears as a purely resistant load to the power line input. A high power factor, close to unity, for example, indicates that the load on the power line input approaches the characteristics of a resistive load. A unity power factor is desirable to avoid capacitive or inductive impedances that can undermine the quality of the power line input supplied to other devices connected to the power line. Accordingly, an HID ballast should provide power factor correction to avoid excessive impedances on the line input.

It is often the case that an electronic ballast designed to meet the above described design challenges is realized with a number of components and integrated circuits to control the electronic ballast to provide proper operation. For example, each side of a full bridge used to operate an HID lamp typically has its own driver integrated circuit, IC, while another IC is used as a control for power factor correction. Still other ICs are often used to realize a system control for overall operation of the electronic ballast, including driving switches and obtaining feedback. It would be desirable to obtain an electronic ballast for an HID lamp with a simplified construction and reduced component count to improve ballast efficiency and reduce costs.

SUMMARY OF THE INVENTION

In accordance with a preferred embodiment of the present invention, there is provided a single integrated circuit to provide all the control signals in an electronic ballast for an HID lamp. The control IC provides gate signals for switching an input stage switch to obtain a high power factor by drawing an input current in phase with an input voltage. The gate signals also obtain a regulated DC bus for power supply to the electronic ballast. In addition, the control IC provides gate signals for operating the full bridge used to drive a standard HID lamp. The full bridge is driven by the control IC at approximately 200 Hz to avoid acoustic resonance. The control IC contains system control features for driving the full bridge to regulate lamp power and for detecting fault conditions in the electronic ballast or lamp.

In accordance with several advantageous features of the present invention, the control IC according to the present invention provides a 600V full bridge driver, an 800V boost buck driver and control and protection features for completely operating an HID lamp. In accordance with a particular feature offered by the control IC according to the present invention, a timer circuit is provided that permits multiple ignition pulses to be generated for lamp ignition with an interval between ignition attempts being five minutes. The ignition pulses are used to drive the igniter to start or restart the lamp in the case of, for example, a fault condition such as low input voltage. The five-minute wait period permits the HID lamp to cool to a particular temperature to avoid a high voltage hot restrike ignition condition. The control IC also provides an igniter signal that can be directly used to drive an external igniter.

A single stage buck-boost converter converts line input power to regulated DC bus power with high power factor. The buck-boost driver control for the PFC circuit operates using a three pin control. One pin senses zero crossing of the current, another pin provides compensation for the buck-boost converter and a third pin senses the bus voltage to obtain a regulated DC bus voltage.

The control IC also provides features for sensing feedback values to regulate current and voltage on the lamp and regulate bus voltage between a specified range of operation. An input setting for user selectable power delivered to the HID lamp is also available.

The above and other features are described in greater detail in the following description read in conjunction with the accompanying drawings.

BRIEF DESCRIPTION OF THE DRAWINGS

The present invention is described in greater detail below with reference to the accompanying drawings, in which.

DETAILED DESCRIPTION OF THE PREFERRED EMBODIMENTS

Figure 1:
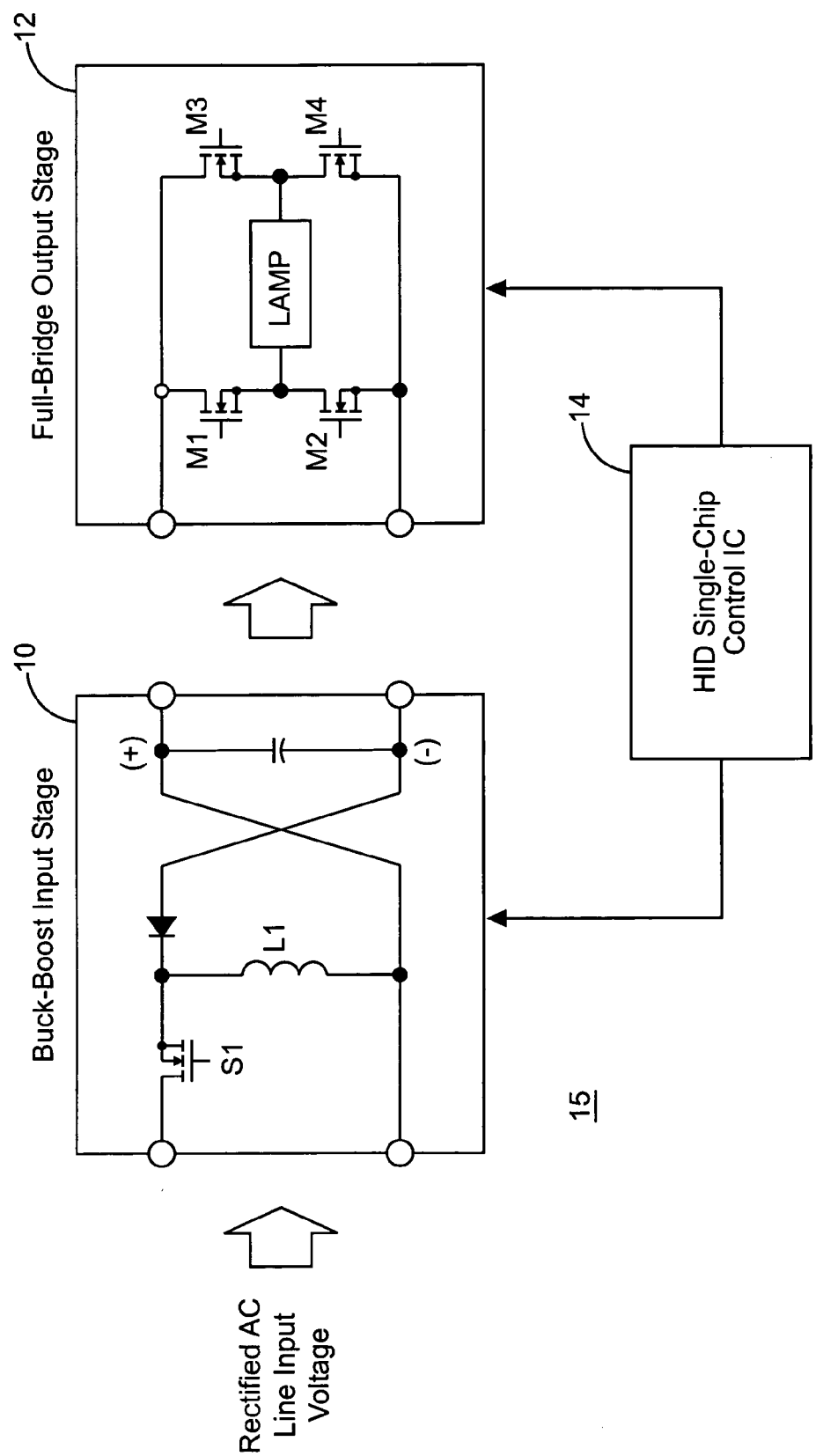
FIG. 1 is a block diagram illustrating overall organization of the circuit according to the present invention.

Referring now to FIG. 1, the present invention is illustrated in a block diagram 15 where the electronic ballast consists of two stages, a buck-boost input stage 10 and a full bridge output stage 12. Full bridge output stage 12 is composed of switches M1–M4, which are switched at a frequency of approximately 200 Hz to avoid acoustic resonance as discussed above. Parameters in the different stages 10 and 12 are sensed and controlled by a control IC 14.

Control IC 14 provides gate signals for controlling switches M1–M4 in the full bridge output stage 12 used to drive the HID lamp. Control IC 14 provides a single chip control solution for driving the HID lamp in full bridge output stage 12, while also controlling buck-boost input stage 10 to obtain high power factor and a regulated DC bus.

Buck-boost input stage 10 includes a switch S1 for operating stage 12 as a buck-boost converter. Control IC 14 provides gating signal for controlling switch S1 and buck-boost input stage 10 to draw a sinusoidal input current in phase with an input voltage to obtain a high power factor. Buck-boost input stage 10 runs in critical conduction mode to draw the appropriate input current while regulating DC bus voltage so that a constant lamp power may be maintained.

Control IC 14 receives a number of feedback signals from buck-boost input stage 10 and full bridge output stage 12 to control these stages and detect faults in the electronic ballast or the lamp. For example, control IC 14 senses current in the full bridge output stage 12 to determine whether an overcurrent condition exists that may result from lamp removal or failure. Control IC 14 also provides protections for the electronic lamp ballast and the HID lamp, such as in the case of undervoltage operation or when the lamp must be reignited after being extinguished unintentionally, such as may happen with an undervoltage condition. Control IC 14 provides a timer circuit that preferably generates a five-minute wait period, for example, between ignition pulses to reignite the lamp when it is unintentionally extinguished. The five-minute wait period permits the lamp to cool, thereby avoiding high voltages that would otherwise be required to reignite the lamp in a hot condition.

Control IC 14 also senses conditions in buck-boost input stage 10 to determine zero crossing points for the current in the inductor and bus voltage so that bus voltage can be regulated, for example. Control IC 14 switches switch S1 based on a zero crossing of the current in the inductor in buck-boost input stage 10 to provide PFC so that the electronic ballast approaches the appearance of a purely resistive load for the line input. Control IC 14 also includes a lamp power input so that a programmed lamp power can be maintained. Lamp current and voltage are sensed by control IC 14 so that the bus voltage can be regulated with a nominal bus voltage value to obtain the desired power on the lamp.

Control IC 14 realizes a number of advantages in combination with the buck-boost power converter for providing an electronic ballast. A 600V full bridge driver functionality is incorporated into the control IC 14, for operation at approximately 200 Hertz, for example. Control IC 14 also provides an 800V buck-boost driver for the switch in the buck-boost converter of buck-boost input stage 10. Control IC 14 has a feedback control loop to provide PFC, while regulating a bus voltage to control lamp power. The timing circuit in control IC 14 permits ignition retry sequences with intervals to permit the lamp to cool in the event of non-ignition or when the lamp is extinguished. In conjunction with the timing circuit, the electronic ballast is shut down after a set number of failed ignitions as determined with control IC 14. Control IC 14 also provides programmable features for electronic ballast start up, so that a user can set a start up sequence for the electronic ballast. Control IC 14 also provides a number of failure detection and protection features, including a failure to ignite the lamp, a missing lamp protection, a lamp end of life protection and a protection for a malfunctioning lamp. The IC 14 is also protected from overheating with an internal thermal limit circuit.

Control IC 14 also provides micro power start up to initiate circuit operation prior to high power switching. The micro power feature is also useful for fault conditions, where it is desired to have the circuit in an operational mode without switching the switches in the full bridge. In addition, control IC 14 has a latch immunity feature to prevent latch up, and ESD protection to prevent damage from electrostatic discharge.

Figure 5:
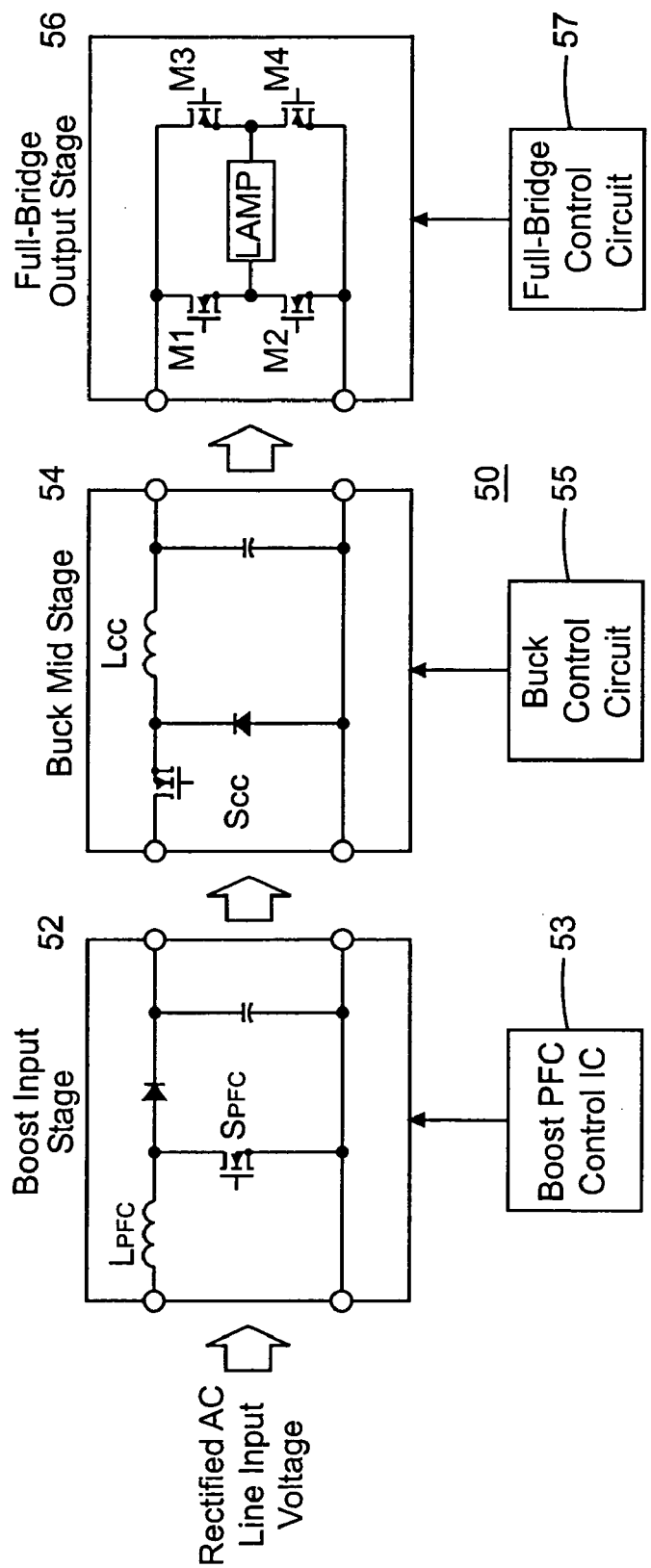
FIG. 5 is a block diagram illustrating overall organization of a conventional electronic ballast.

Referring for a moment to the conventional HID electronic ballast illustrated in FIG. 5 as diagram 50, a three stage solution is illustrated. The conventional solution provides a boost input stage 52, a buck mid stage 54 and a full bridge output stage 56. The conventional circuit illustrated in diagram 50 includes an inductor LPFC and switch SPFC in boost input stage 52, an inductor LCC and switch SCC in buck mid stage 54 and four switches M1–M4 in full bridge output stage 56. In addition, the circuit realized in diagram 50 includes a number of other supporting components that are used for feedback and control functions in each of stages 52, 54 and 56. Boost input stage 52 provides PFC at the line input and a regulated DC bus voltage. Buck mid stage 54 provides current control to full bridge output stage 56 for lamp power. Full bridge output stage 56 provides control for the HID lamp for pre-ignition, ignition and running operations. In the conventional solution of diagram 50, independent control circuits 53, 55 and 57 control each of stages 52, 54 and 56, respectively. Control circuit 53 senses conditions in boost input stage 52 and operates switch SPFC in accordance with maintaining a high power factor and a regulated DC bus voltage. Control circuit 55 senses parameters in buck mid stage 54 and full bridge output stage 56 and provides a control to switch SCC for current control in buck mid stage 54. Control circuit 57 senses conditions in full bridge output stage 56 and operates switches M1–M4 to drive the HID lamp in accordance with a particular design goal, such as in a constant power mode, for example.

Referring again to FIG. 1, the circuit in diagram 15 includes buck-boost input stage 10 and full bridge output stage 12, where buck-boost input stage 10 provides all the functionality of the separate boost and buck stages of the conventional electronic ballast. In addition, buck-boost input stage 10 and full bridge output stage 12 are controlled by a single control circuit that can be realized up with a single control IC 14. Control IC 14 provides all the sensing and control operations for switching switch S1 and switches M1–M4 in stages 10 and 12. In this realization of the present invention, buck-boost input stage 10 includes a single inductor L1 and a single switch S1 to realize all the desired functionality in buck-boost input stage 10. By consolidating the conventional input stages into buck-boost input stage 10, the present invention provides a more efficient realization of an electronic ballast with fewer components and a corresponding reduction in additional components used to sense and control the electronic ballast.

Figure 2:
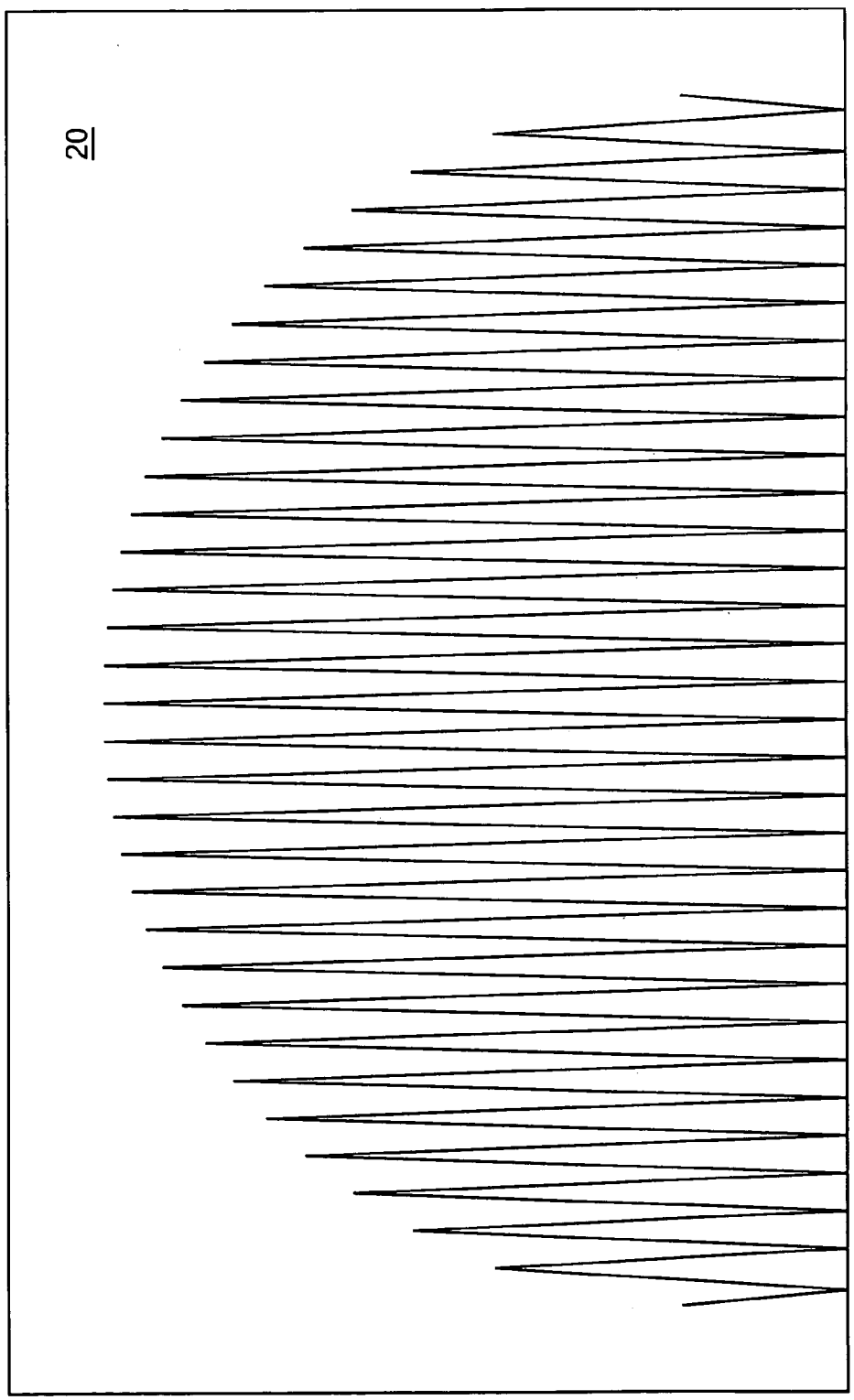
FIG. 2 is a graph illustrating inductor current during a half cycle of AC line input voltage according to the electronic ballast of the present invention.

Referring now to FIG. 2, a waveform of input current is illustrated in graph 20. The current peaks generally follow an envelope related to the input voltage waveform to obtain a high power factor with a low total harmonic distortion. This waveform is achieved through operation of buck-boost input stage 10, as described in greater detail below.

Figure 3:
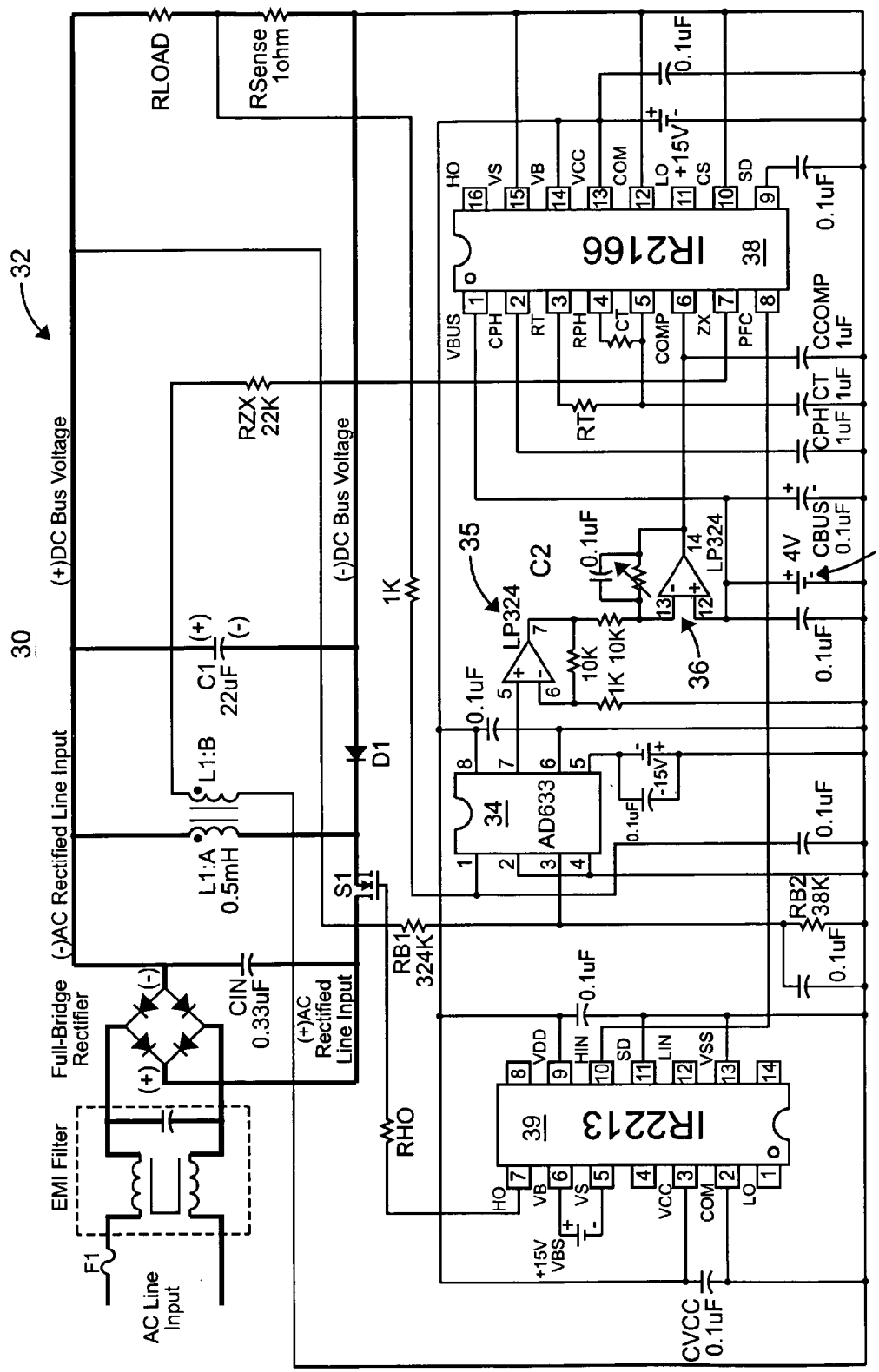
FIG. 3 is a circuit diagram of the electronic ballast according to the present invention.

Referring now to FIG. 3, a topology and control circuit for realizing a buck-boost converter in an HID electronic ballast according to the present invention is illustrated generally as circuit 30. Circuit 30 shows darkened lines carrying high power, and a resistor RLOAD in place of the switching full bridge and HID lamp for illustration purposes. Sensing and control signals are illustrated in light solid lines. The electronic ballast circuit provides control to the lamp for pre-ignition, ignition, running, fault protection and end of life protection. The buck-boost converter according to the present invention provides PFC for the line input and provides regulated voltage to a lamp output stage, illustrated in diagram 30 as resistor RLOAD for discussion purposes. A buck-boost stage 32 includes a switch S1 connected between a positive node of the AC rectified line input and an inductor L1. Inductor L1 is connected between switch S1 and the negative node of the AC rectified line input. A diode D1 is arranged in buck-boost stage 32 with a cathode connected to the inductor, and the anode connected to a negative node of a DC bus capacitor C1. DC bus capacitor C1 is arranged in buck-boost converter stage 32 with the negative node connected to the anode of diode D1 and the positive node connected to the negative node of the AC rectified line input.

Buck-boost converter stage 32 operates by switching S1 to charge inductor L1 at appropriate times, and to permit inductor L1A to discharge to supply electrical energy to resistor RLOAD and capacitor C1. When switch S1 is closed, or in a conducting state, inductor L1A is connected across the positive and negative nodes of the AC rectified input, so that current flowing through inductor L1A begins to increase linearly. Diode D1 blocks current from flowing into DC bus capacitor C1 when switch S1 is closed. When the current from inductor L1A reaches a given value, as is determined by the on time of switch S1, switch S1 is opened, or made non-conducting, and inductor L1A becomes connected across DC bus capacitor C1. The current stored in inductor L1A discharges linearly and flows into the positive node of DC bus capacitor C1 so that the voltage on DC bus capacitor C1 increases. Diode D1 allows current to flow between DC bus capacitor C1 and inductor L1A during the off time of switch S1 so that the voltage on the positive node of DC bus capacitor C1 increases with respect to the negative node of DC bus capacitor C1. The off time of switch S1 is governed by the current through inductor L1A discharging to zero, at which point switch S1 closes and a new cycle for switch S1 begins. This cycle of switching and energy transfer is continually repeated through operation on switch S1 to achieve the design goals of buck-boost converter. For example, the DC bus voltage level determines the on time of switch S1 to obtain a regulated DC bus voltage. If the DC bus voltage decreases below a desired level, the on time for switch S1 is increased to supply additional current to DC bus capacitor C1 through current charging on inductor L1A. The more current supplied to DC bus capacitor C1, the higher the charge and thus DC bus voltage level. If the DC bus voltage increases above a desired level, the on time of switch S1 is decreased to supply less current to DC bus capacitor C1 through inductor L1A, thereby decreasing the DC bus voltage.

Another important aspect of the operation of buck-boost converter stage 32 is controlling output power. Output power control is important for handling operation of the HID lamp in its different modes of operation. During pre-ignition and ignition, for example, the DC bus is regulated to a certain voltage level so that an ignition circuit can supply a sufficient amount of voltage across the lamp, e.g., 5 kV to ignite the lamp and establish the lamp arc. Once the lamp is ignited, and during the initial warm up period of the lamp, the DC bus voltage drops to about 20V as determined by the lamp voltage. In addition, the lamp consumes about two amps during this ignition phase. After several minutes, as the lamp warms up, the DC bus voltage reaches a steady state value of approximately 100V and the lamp consumes about 400 Ωamps of current. Because of all these different modes of operation for the HID lamp, constant output power regulation is highly desirable.

Regulation of output power to a constant level is provided in buck-boost converter stage 32 by obtaining a load current sense value through resistor RSENSE, and the DC bus voltage value through a voltage divider network composed of resistors RB1 and RB2. The bus voltage and load current are multiplied together to obtain a power value with multiplier circuit chip 34. The resulting feedback power value is amplified, for example by a factor often through the ratio of the 10K and 1K resistors in op-amp gain circuit 35. The output of op-amp gain circuit 35 is provided to a standardly configured feedback op amp circuit 36, consisting of an op-amp, potentiometer and capacitor C2. Standard feedback op-amp circuit 36 regulates the output power against a fixed 4V threshold 37 to provide a compensation signal for regulating the DC bus voltage. Accordingly, the output of standard feedback op-amp circuit 36 is provided to the COMP pin of control IC 38. As the output power increases or decreases above or below 4V threshold 37, op-amp circuit 36 appropriately modifies a signal on the COMP pin so that the on time of the PFC output pin on control IC 38 increases or decreases to maintain a constant power. For example, if the power decreases, the on time provided by the signal on the PFC output pin is increased so that the current delivered to resistor RLOAD through inductor L1A is increased. If the delivered power tends to increase, the on time switch S1 is decreased based on the value supplied to the COMP pin, so that the current delivered to the load, and consequently capacitor C1, is decreased.

This simple configuration for the feedback and control of buck-boost converter permits a robust control with a small number of components and signals. Buck-boost converter stage 32 realizes a high PFC, while maintaining good DC bus voltage regulation. The feedback loop for sensing bus voltage and adjusting switch on-time preferably has a reduced response time so that the charging and discharging inductor current follows an envelope that has a shape that is substantially the same as the AC input line voltage. By providing an appropriate feedback loop speed, a high power factor is maintained while obtaining a low total harmonic distortion (THD).

Inductor current is detected for feedback purposes through a secondary winding inductor L1B. The current from inductor L1B is coupled to a ZX pin for signaling when the inductor current discharges to zero with each charging/discharging cycle. The PFC control circuit that is internal to control IC 38 provides all the functionality involving signals on pins ZX, COMP, VBUS and PFC to provide the PFC control for buck-boost converter stage 32. Due to the simplified operation of buck-boost converter, a control method that is substantially similar to that used for a boost type converter can be applied to buck-boost converter stage 32.

A signal for switching S1 is provided on pin PFC of control IC 38 to realize PFC and a bus voltage regulation in buck-boost converter stage 32. However, switch S1 is preferably not referenced to COM of control IC 38, so that a signal level shift is used to provide gating signals for switch S1 based on the signal on pin PFC. Accordingly, a level shift IC 39 is used to shift the source of the gate to source control voltage to the source of switch S1. That is, level shift IC 39 boosts the gate signal for switch S1 to an appropriate level, with switching control provided by the signal on pin PFC of control IC 38.

In diagram 30, the HID lamp and full bridge is simulated with resistor RLOAD. In the simulation resistor RLOAD is set to a low value to simulate the HID lamp during an initial warm up period after ignition. The value of RLOAD is adjusted to a higher value for a steady state condition to simulate normal running operation of the HID lamp in the full bridge circuit. The circuit of diagram 30 provides constant power to resistor RLOAD as it varies while simulating the different modes of operation for the HID lamp.

Referring again to FIG. 2, graph 20 illustrating an inductor current waveform for ½ cycle of the AC line input voltage is shown. As the rectified AC line input voltage increases and decreases during the cycle time of the main input voltage, switch S1 is switched to cause current to charge and discharge inductor L1A (FIG. 3). Each cycle of switch S1 results in a current waveform that is substantially triangular shaped with a peak that increases and decreases in accordance with the AC input voltage level. That is, the AC input voltage level forms an envelope for the peaks of the triangles in the inductor current waveform. The on-time of switch S1 remains relatively constant over the course of a cycle, while the off time of switch S1 is determined by the time it takes for the current in inductor L1A to discharge from the peak current value to zero. Because the peak current value increases and decreases with the input voltage level, the off time of switch S1 varies over the course of an input voltage cycle. In accordance with this configuration, the frequency of the inductor current is variable and free running, with the lowest frequencies obtained at the peak of the input voltage half cycle, and the highest frequencies occurring near the zero crossings of the input voltage. The inductor current is discharged to zero with each inductor charging/discharging cycle, so that buck-boost converter stage 32 is operated in critical conduction mode, which forms the border between continuous and discontinuous conduction modes.

Figure 4:
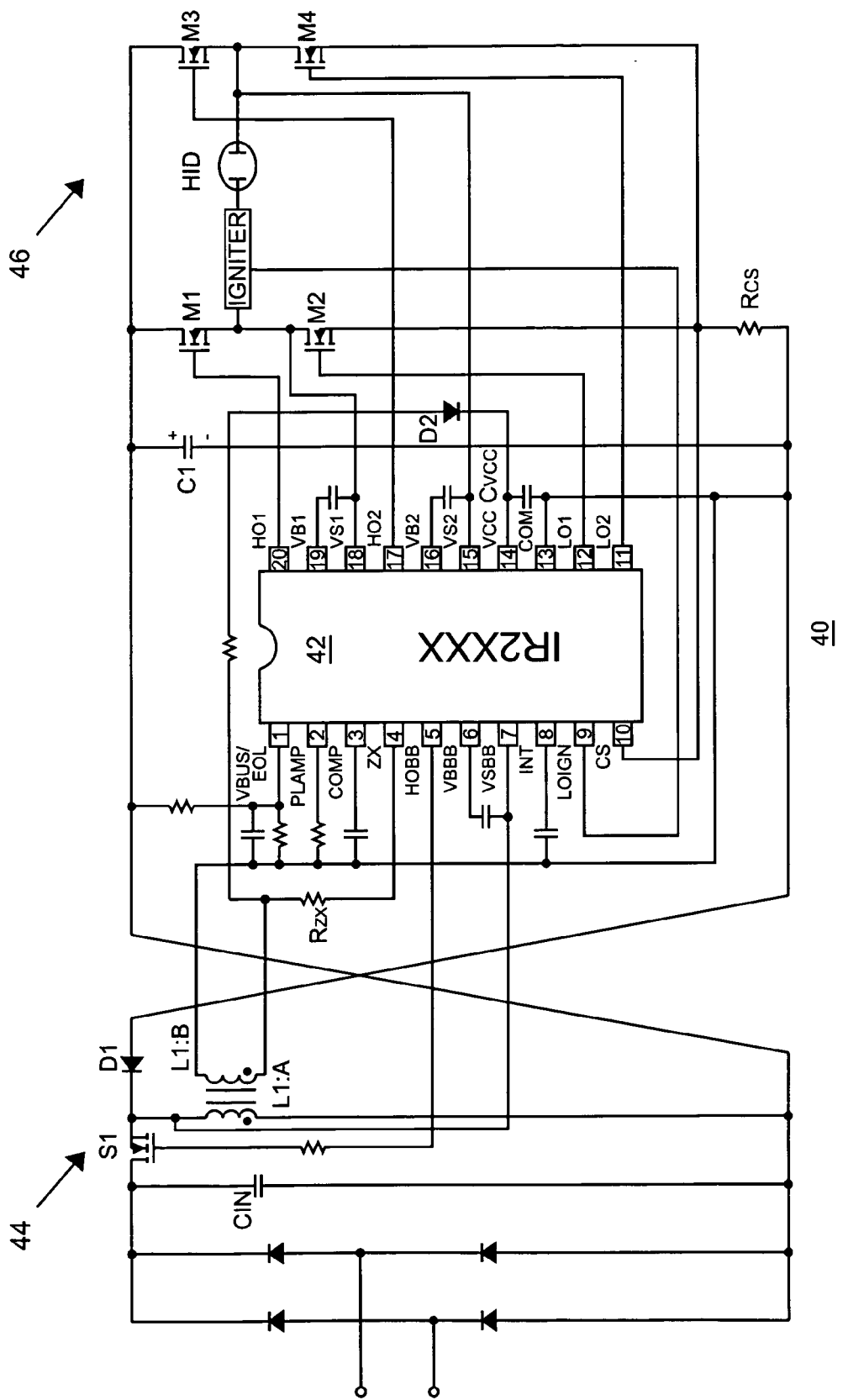
FIG. 4 is a circuit diagram of an electronic ballast for an HID lamp using a control IC in accordance with the present invention.

Referring now to FIG. 4, a circuit diagram 40 illustrates a simplified solution for control of the electronic ballast with an input buck-boost converter 44 and a full bridge output stage 46. In accordance with the solution provided by the circuit in diagram 40, a single control IC 42 provides control for the electronic ballast by receiving all sensing signals and delivering all control signals in the electronic ballast. Accordingly, buck-boost converter 44 is controlled with a zero crossing signal supplied on pin ZX, a regulation signal supplied on pin COMP, a bus voltage value on pin VBUS and a gate signal supplied by pin HOBB. These four signals supply a complete control configuration for buck-boost converter 44 to supply regulated DC power to full bridge circuit 46 consisting of switches M1–M4 and the HID lamp while obtaining a high power factor and current control for lamp power regulation. Control IC 42 provides a level shifted gate signal to drive switch S1 in buck-boost converter 44 through pins VBBB and VSBB, so that no additional circuitry is needed to operate switch S1 with the gate signal provided on pin HOBB.

Control IC 42 includes a lamp power input on pin PLAMP for programming the desired lamp power. By appropriately setting the resistor connected to pin PLAMP, power supplied to the HID lamp can be regulated to a constant value.

An ignition signal for operating the igniter of the HID lamp is provided on pin LOIGN to provide functionality for HID lamps with external igniters. In addition, control IC 42 obtains a current sense signal on pin CS based on the value of the voltage on resistor RCS. For example, if the voltage on resistor RCS, as received on pin CS, is greater than a predetermined voltage level, a lamp overcurrent fault is indicated, such as a failure of the lamp to strike. Control IC 42 also provides an INT pin to permit integrated programming, such as in the case of amplification signal conditioning, for example. Control IC 42 provides all the drive signals for separately operating the two half bridges composed of switches M1 and M2, and switches M3 and M4, respectively, to form the full bridge used to drive the HID lamp. For example, control IC 42 provides signals on pins HO1 and LO1 for switches M1 and M2, respectively, and provides signals HO2 and LO2 for switches M3 and M4, respectively. These gate signals are used to switch switches M1–M4 in controlling the HID lamp. Accordingly, the internal circuitry of control IC 42 provides appropriate level shifting, dead time, control and driver circuits for operating switches M1–M4. Two separate reference signals are connected to the midpoints of the two half bridges, from pins VS1 and VS2, for example.

Power to control IC 42 is provided on pin VCC, through the secondary winding of inductor L1B, diode D2 and capacitor CVCC. Accordingly, control IC 42 is self-contained with all functionality needed to realize PFC, bus voltage regulation, current control and lamp power control in the electronic ballast of diagram 40. Buck-boost converter 44 provides a simplified and novel approach to obtain supply power, voltage and current control, while maintaining a high power factor with simplified configuration and reduced number of components. In addition, the electronic ballast includes fault protection to handle a large number of faults, including bus undervoltage, lamp overcurrent, lamp end of life, failure to ignite the lamp, and short circuit protection.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power converter for delivering power to a load, comprising:
   a single stage buck-boost converter for converting a rectified input signal;
   a switching output stage for converting the DC signal to a switched signal delivered to the load; and
   a controller coupled to the buck-boost converter and the output stage for controlling the buck-boost converter and the output stage;
   wherein the buck-boost converter includes a switch driven by the controller;
   an inductor coupled to the switch for storing current supplied by the switch; and
   a drive signal provided from the controller to the switch to switch the switch to a conducting state when current through the inductor is substantially zero.

2. The power converter according to claim 1, further comprising a diode coupled to the switch and the inductor for directing current from the switch to the inductor.

3. The power converter according to claim 2, further comprising a capacitor coupled to the diode and the inductor for storing energy supplied by the inductor when the diode is conducting.

4. The power converter according to claim 1, further comprising a feedback signal from the inductor to the controller for determining when the inductor current is substantially zero.

5. A power converter for delivering power to a load, comprising:
   a single stage buck-boost converter for converting a rectified input signal;
   a switching output stage for converting the DC signal to a switched signal delivered to the load; and
   a controller coupled to the buck-boost converter and the output stage for controlling the buck-boost converter and the output stage;
   wherein the buck-boost converter includes a switch driven by the controller;
   an inductor coupled to the switch for storing current supplied by the switch; and
   a drive signal provided by the controller to the switch to switch the switch to a conducting state for a selected period of time, whereby current stored in the inductor varies depending upon the selected period of time the switch is in the conducting state.

6. The power converter according to claim 1 or claim 5, said controller comprising a single IC which is coupled to both the buck-boost converter and the output stage, said single IC controlling both the buck-boost converter and the output stage; and
   drive signals provided from the controller to the switch, the drive signals being operable to switch the switch to draw an input current substantially in phase with an input voltage;
   feedback signals from the output stage to the controller for providing to the controller an indication of output power supplied to the output stage; and
   circuitry in said single IC for maintaining said output power constant by receiving said indication of output power and responsively controlling said drive signals provided to said switch to control an on-time of said switch.

7. A method for controlling the power converter according to claim 1, comprising:
   operating the buck-boost converter to draw an input current in phase with an input voltage;
   operating the buck-boost converter to obtain a regulated DC bus voltage supplied from the buck-boost converter to the output stage; and
   operating the output stage to supply a constant power to the load.

8. The power converter according to claim 1, wherein said feedback signals are representative of a voltage and a current at said output circuit.

9. The power converter according to claim 5, further comprising a diode coupled to the switch and the inductor for directing current from the switch to the inductor.

10. The power converter according to claim 9, further comprising a capacitor coupled to the diode and the inductor for storing energy supplied by the inductor when the diode is conducting.

11. The power converter according to claim 1 or claim 5, further comprising a switching full bridge in the output stage for supplying power to the load, the switches in the switching full bridge being controllable by the controller.

12. The power converter according to claim 1 or claim 5, further comprising a feedback signal from the buck-boost converter to the controller for contributing to determining when the switch is switched.

13. An electronic ballast for driving an HID lamp, comprising the power converter of claim 1 or claim 5.

14. An integrated circuit controller for controlling a power converter according to claim 1 or claim 5, comprising:
   a single IC which includes:
   a power factor correction circuit for driving the switch in the buck-boost converter based on buck-boost converter parametric signals supplied to the integrated circuit;

a driver circuit for driving a switching full bridge circuit to control power delivered to a load connected to the switching full bridge circuit;

drive signals provided from the controller to the switch, the drive signals being operable to switch the switch to draw an input current substantially in phase with an input voltage;

feedback signals from the output stage to the controller for providing to the controller an indication of output power supplied to the output stage; and circuitry in said single IC for maintaining said output power constant by receiving said indication of output power and responsively controlling said drive signals provided to said switch to control an on-time of said switch.

15. The integrated circuit according to claim 14, further comprising a current sense circuit having an input coupled to the switching full bridge circuit to obtain an indication of current flowing through the switching full bridge circuit.

16. The integrated circuit according to claim 14, further comprising an electronic ballast for driving an HID lamp.

17. The integrated circuit according to claim 14, wherein said feedback signals are representative of a voltage and a current at said output circuit.

18. A buck-boost converter for supplying regulated power from a rectified AC input, comprising:

a switch coupled to the rectified AC input for switching the rectified AC input;

an inductor coupled to the switch for storing current supplied through the switch when the switch is in a conducting state;

a diode coupled to the switch and the inductor for directing current from the switch to the inductor when the diode is not conducting; and a capacitor coupled to the diode and the inductor for storing energy supplied by the inductor when the diode is conducting, the capacitor supplying an output of the buck-boost converter.

19. The buck-boost converter according to claim 18, further comprising:

a controller for controlling the buck-boost converter; and an output signal of the controller coupled to the switch for switching the switch.

20. The buck-boost converter according to claim 19, wherein the controller is operable to provide a switching signal to the switch to draw an input current in phase with an input voltage.

21. A buck-boost converter according to claim 19, further comprising a feedback signal from the inductor to the controller to provide an indication of the voltage or current of the inductor.

22. The buck-boost converter according to claim 19, wherein the controller comprises an integrated circuit.

* * * * *